United States Patent [19]
Reents

[11] Patent Number: 5,966,914
[45] Date of Patent: Oct. 19, 1999

[54] PIVOTING LAWN MOWER-MOUNTED EDGER

[76] Inventor: Thomas R. Reents, 403 N. Pine St., Janesville, Wis. 53545

[21] Appl. No.: 09/044,332

[22] Filed: Mar. 19, 1998

[51] Int. Cl.⁶ .................................................. A01D 53/14
[52] U.S. Cl. .............................. 56/16.7; 56/16.9; 56/12.7
[58] Field of Search .................................... 56/12.1, 12.7, 56/16.7, DIG. 17, DIG. 20, 16.9; 30/276

[56] References Cited

U.S. PATENT DOCUMENTS

| | | | |
|---|---|---|---|
| 3,782,085 | 1/1974 | Parker et al. | 56/16.9 X |
| 4,170,099 | 10/1979 | Owens | 56/16.9 |
| 4,642,976 | 2/1987 | Owens | 56/16.9 |
| 5,048,276 | 9/1991 | Miller | 56/16.9 |
| 5,226,284 | 7/1993 | Meehleder | 56/16.9 X |

*Primary Examiner*—Thomas B. Will
*Assistant Examiner*—Robert Pezzuto

[57] ABSTRACT

A lawn mower-mounted weed trimmer is provided including a lawn mower with a weed trimmer assembly hingably coupled about a horizontal axis to one of the side faces of the mower portion of the lawn mower adjacent to a front face thereof. The horizontal axis is in line with movement of the lawn mower. The weed trimmer assembly has a flexible line dispenser for trimming weeds adjacent to the lawn mower when rotated. Next provided is a driving mechanism for selectively rotating the flexible line dispenser.

1 Claim, 3 Drawing Sheets

PIVOTING LAWN MOWER-MOUNTED EDGER

BACKGROUND OF THE INVENTION

1. Field of the Invention

The present invention relates to lawn mower edgers and more particularly pertains to a new pivoting lawn mower-mounted edger for trimming edges of walls, side walks and drive ways with a trimmer while mowing.

2. Description of the Prior Art

The use of lawn mower edgers is known in the prior art. More specifically, lawn mower edgers heretofore devised and utilized are known to consist basically of familiar, expected and obvious structural configurations, notwithstanding the myriad of designs encompassed by the crowded prior art which have been developed for the fulfillment of countless objectives and requirements.

Known prior art lawn mower edgers include U.S. Pat. No. Des. 304,728; U.S. Pat. No. 4,642,976; U.S. Pat. No. 4,718,221; U.S. Pat. No. 4,551,967; U.S. Pat. No. 4,854,115; and U.S. Pat. No. 4,478,028.

In these respects, the pivoting lawn mower-mounted edger according to the present invention substantially departs from the conventional concepts and designs of the prior art, and in so doing provides an apparatus primarily developed for the purpose of trimming edges of walls, side walks and drive ways with a trimmer while mowing.

SUMMARY OF THE INVENTION

In view of the foregoing disadvantages inherent in the known types of lawn mower edgers now present in the prior art, the present invention provides a new pivoting lawn mower-mounted edger construction wherein the same can be utilized for trimming edges of walls, side walks and drive ways with a trimmer while mowing.

The general purpose of the present invention, which will be described subsequently in greater detail, is to provide a new pivoting lawn mower-mounted edger apparatus and method which has many of the advantages of the lawn mower edgers mentioned heretofore and many novel features that result in a new pivoting lawn mower-mounted edger which is not anticipated, rendered obvious, suggested, or even implied by any of the prior art lawn mower edgers, either alone or in any combination thereof.

To attain this, the present invention generally comprises a lawn mower having a mower portion with a plurality of wheels mounted thereon. An inverted U-shaped handle is mounted on the mower portion for allowing the pushing of the lawn mower. The lawn mower further includes a lawn mower blade central drive mechanism with a horizontally oriented pulley of a first diameter. The central drive mechanism is adapted to rotate coincidently therewith about a fixed axis. Next provided is a horizontally oriented auxiliary pulley adapted to rotate about an axis fixed with respect to the mower portion of the lawn mower. The auxiliary pulley is equipped with a second diameter less than the first diameter. Also included is weed trimmer assembly having a housing hingably coupled about a horizontal axis. The positioning of the housing is preferably on one of the side faces of the mower portion of the lawn mower adjacent to a front face thereof. The aforementioned horizontal axis is in line with movement of the lawn mower. The housing has a disk-shaped flexible line dispenser rotatably coupled about an axis fixed with respect to the housing for trimming weeds adjacent to the lawn mower when rotated. Also included is a horizontally oriented weed trimmer pulley mounted to the mower portion of the lawn mower and situated within the housing. The weed trimmer pulley is rotated about an axis fixed with respect to the mower portion of the lawn mower. A post is coupled to a bottom face of the weed trimmer pulley. The post is in turn coupled to a top face of the disk-shaped flexible line dispenser for rotating coincidently therewith. It is imperative that the post have a universal joint for allowing the tilting of the disk-shaped flexible line dispenser with the housing. A belt is mounted about the pulley of the drive mechanism, auxiliary pulley, and weed trimmer pulley for rotating the weed trimmer pulley only when the belt is taut. A weed trimmer actuation assembly includes an actuation pulley mounted on the mower portion of the lawn mower. The actuation pulley is adapted to be rotated about an axis residing within a designated vertical plane which is fixed with respect to the mower portion of the lawn mower. As shown in the various Figures, a lever is mounted on the handle of the lawn mower. A cable is connected between the lever and the actuation pulley for making the belt taut only when biased in an actuated orientation.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new pivoting lawn mower-mounted edger apparatus and method which has many of the advantages of the lawn mower edgers mentioned heretofore and many novel features that result in a new pivoting lawn mower-mounted edger which is not anticipated, rendered obvious, suggested, or even implied by any of the prior art lawn mower edgers, either alone or in any combination thereof.

It is another object of the present invention to provide a new pivoting lawn mower-mounted edger which may be easily and efficiently manufactured and marketed.

It is a further object of the present invention to provide a new pivoting lawn mower-mounted edger which is of a durable and reliable construction.

An even further object of the present invention is to provide a new pivoting lawn mower-mounted edger which is susceptible of a low cost of manufacture with regard to both materials and labor, and which accordingly is then susceptible of low prices of sale to the consuming public, thereby making such pivoting lawn mower-mounted edger economically available to the buying public.

Still yet another object of the present invention is to provide a new pivoting lawn mower-mounted edger which provides in the apparatuses and methods of the prior art some of the advantages thereof, while simultaneously overcoming some of the disadvantages normally associated therewith.

Still another object of the present invention is to provide a new pivoting lawn mower-mounted edger for trimming edges of walls, side walks and drive ways with a trimmer while mowing.

Even still another object of the present invention is to provide a new pivoting lawn mower-mounted edger that includes a lawn mower with a weed trimmer assembly hingably coupled about a horizontal axis to one of the side faces of the mower portion of the lawn mower adjacent to a front face thereof. The horizontal axis is in line with movement of the lawn mower. The weed trimmer assembly has a flexible line dispenser for trimming weeds adjacent to the lawn mower when rotated. Next provided is a driving mechanism for selectively rotating the flexible line dispenser.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
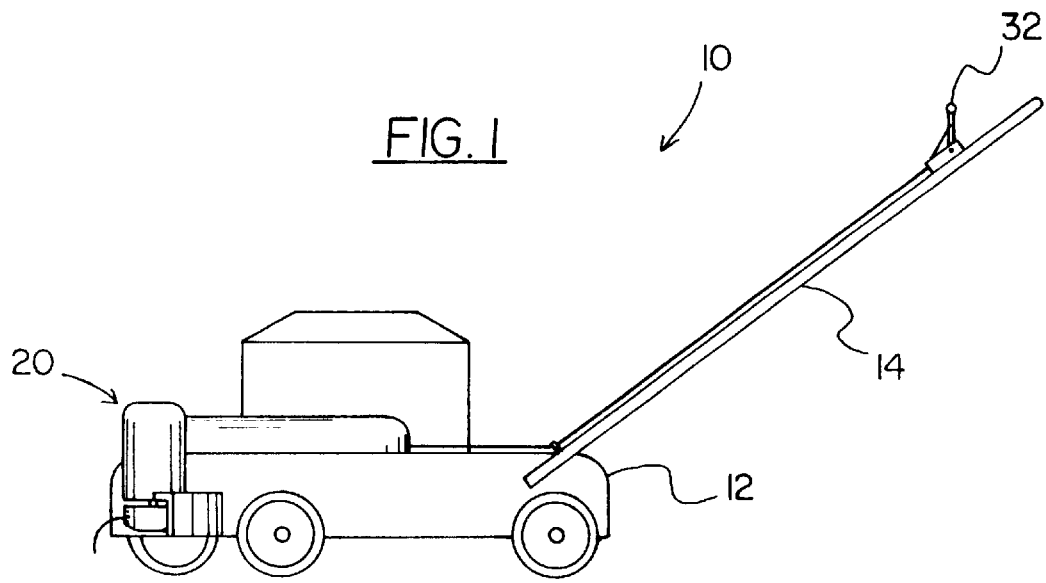
FIG. 1 is a side view of a new pivoting lawn mower-mounted edger according to the present invention.

With reference now to the drawings, and in particular to FIGS. 1 through 6 thereof, a new pivoting lawn mower-mounted edger embodying the principles and concepts of the present invention and generally designated by the reference numeral 10 will be described.

The present invention, designated as numeral 10, includes a lawn mower 12 having a mower portion with a plurality of wheels mounted thereon. An inverted U-shaped handle 14 is pivotally mounted on the mower portion for allowing the pushing of the lawn mower. The lawn mower further includes a lawn mower blade central drive mechanism with a horizontally oriented pulley 16 of a first diameter. The central drive mechanism is adapted to rotate coincidently with the pulley 16 about a fixed axis.

Next provided is a horizontally oriented auxiliary pulley 18 adapted to rotate about an axis fixed with respect to the mower portion of the lawn mower. The auxiliary pulley is equipped with a second diameter less than the first diameter.

Also included is weed trimmer assembly 20 having a housing hingably coupled about a horizontal axis. In the preferred embodiment, a pin and aperture combination or snap lock is employed to fix the position of the housing. The positioning of the housing is preferably on one of the side faces of the mower portion of the lawn mower portion adjacent to a front face thereof. The aforementioned horizontal axis is in line with movement of the lawn mower. The housing has a disk-shaped flexible line dispenser 22 rotatably coupled about an axis fixed with respect to the housing for trimming weeds adjacent to the lawn mower when rotated.

Also included is a horizontally oriented weed trimmer pulley 24 mounted to the mower portion of the lawn mower and situated within the housing. The weed trimmer pulley is thus rotated about an axis fixed with respect to the mower portion of the lawn mower. This may be accomplished by way of brackets or the like. As such, it is critical that the housing be large enough to allow pivoting of the housing with respect to weed trimmer pulley.

A post 26 is coupled to a bottom face of the weed trimmer pulley. The post is in turn coupled to a top face of the disk-shaped flexible line dispenser for rotating coincidently therewith. It is imperative that the post have an unillustrated universal joint for allowing the tilting of the disk-shaped flexible line dispenser with the housing. A belt 28 is mounted about the pulley of the drive mechanism, auxiliary pulley, and weed trimmer pulley for rotating the weed trimmer pulley only when the belt is taut.

Figure 2:
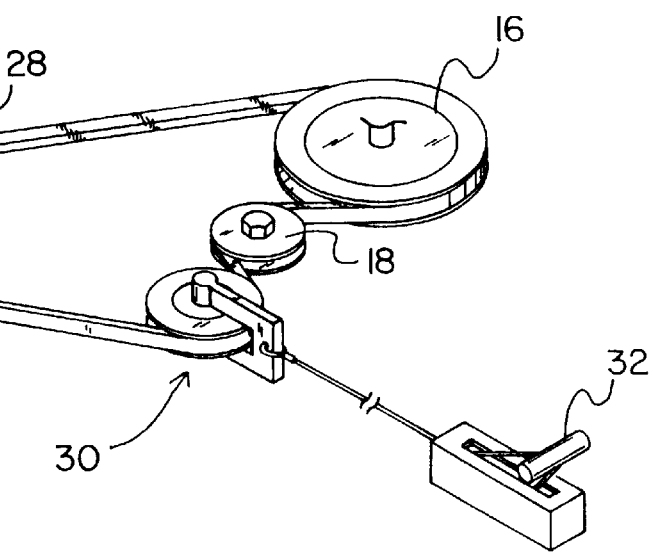
FIG. 2 is a perspective view of the various pulleys of the present invention.

A weed trimmer actuation assembly 30 includes an actuation pulley mounted on the mower portion of the lawn mower. The actuation pulley is adapted to be rotated about an axis residing within a designated vertical plane which is fixed with respect to the mower portion of the lawn mower. To accomplish this, the actuation assembly may be slidably mounted within a linear slot or the like. It should be noted that when the actuation pulley engages the belt, the belt takes on an S-shaped configuration, as shown in FIG. 2.

As shown in the various Figures, a lever 32 is mounted on the handle of the lawn mower. A cable is connected between the lever and the actuation pulley for making the belt taut only when biased in an actuated orientation. This is achieved by sliding the actuation pulley within the slot.

Figure 3:
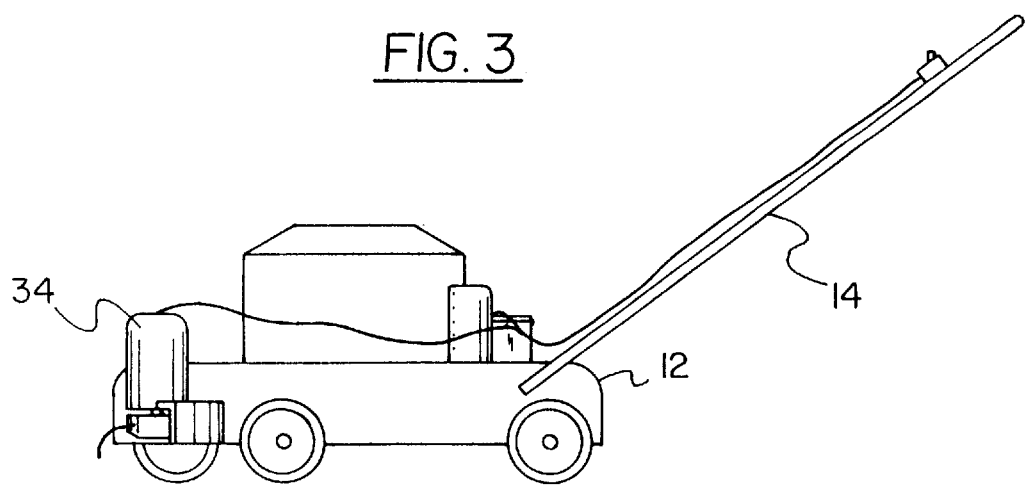
FIG. 3 is a side view of an alternate embodiment of the present invention.
Figure 4:
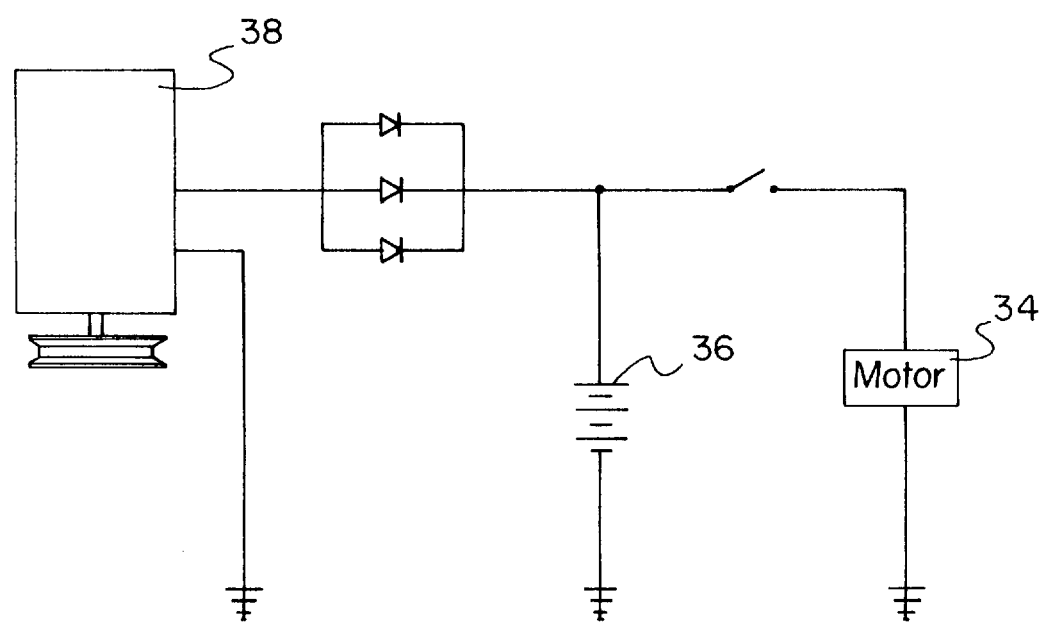
FIG. 4 is a schematic diagram of the electrical components associated with the embodiment of the present invention shown in FIG. 3.
Figure 5:
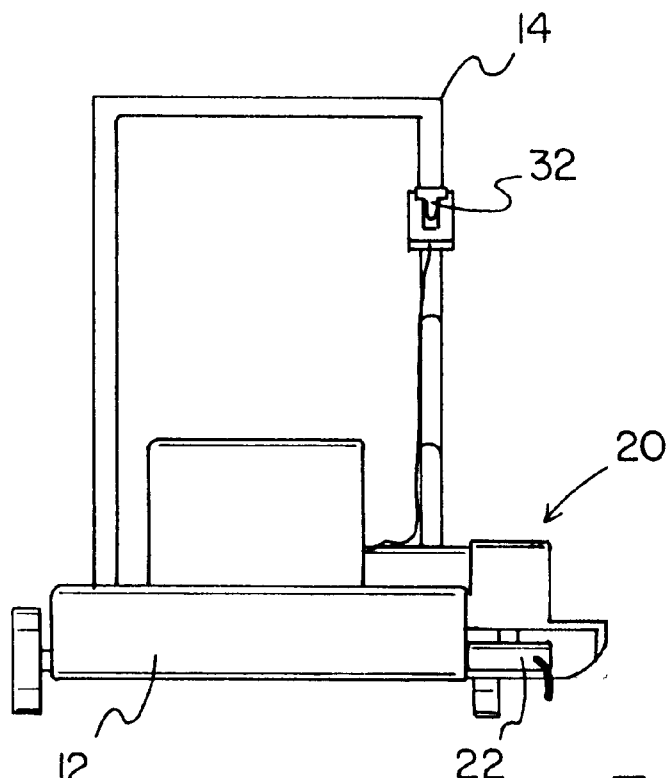
FIG. 5 is a front view of the present invention showing the tilting feature thereof.
Figure 6:
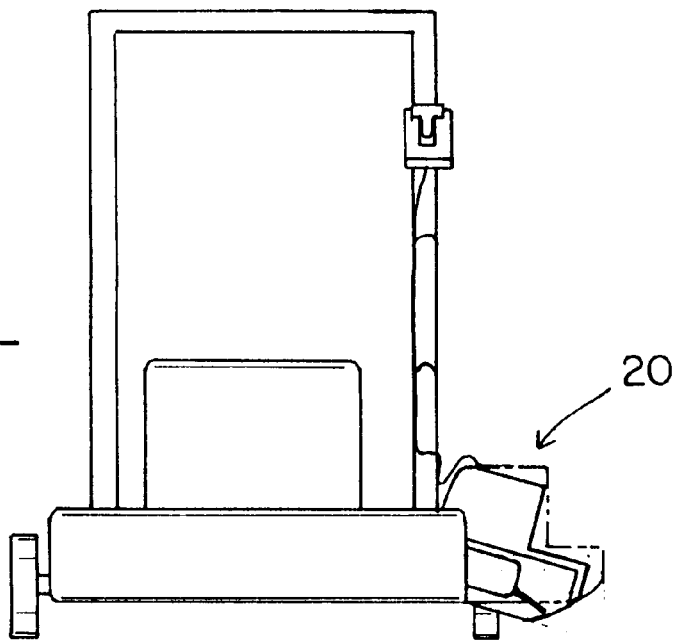
FIG. 6 is another front view of the present invention showing the tilting feature thereof.

In various alternate embodiments, like that shown in FIGS. 3 & 4, a separate electric motor 34 is included that is mounted on the housing of the weed trimmer assembly. Such motor may be selectively powered by both a battery 36 and a generator 38. As yet another option, open air takes may be formed on the lawn mower for directing trimmings under the mower portion for mulching purposes.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A weed trimmer system comprising in combination:

a lawn mower including a mower portion with a plurality of wheels mounted thereon and an inverted U-shaped handle mounted thereon for allowing the pushing of the lawn mower, the lawn mower further including a lawn mower blade central drive mechanism with a horizontally oriented pulley of a first diameter adapted to rotate coincidentally therewith about a fixed first axis;

a horizontally oriented auxiliary pulley adapted to rotate about a second axis fixed with respect to the mower portion of the lawn mower and being equipped with a second diameter less than the first diameter;

a weed trimmer assembly including a housing hingably coupled about a horizontal axis to one of the side faces of the mower portion of the lawn mower adjacent to a front face thereof, wherein the horizontal axis is in line with movement of the lawn mower, the housing having a disk-shaped flexible line dispenser rotatably coupled about an axis fixed with respect to the housing for trimming weeds adjacent to the lawn mower when rotated;

a horizontally oriented weed trimmer pulley being mounted to the mower portion of the lawn mower and situated within the housing and being rotated about a third axis fixed with respect to the mower portion of the lawn mower, the weed trimmer pulley having a post coupled to a bottom face thereof which is in turn coupled to a top face of the disk-shaped flexible line dispenser for rotating the same when rotated, the post having a universal joint for allowing the tilting of the disk-shaped flexible line dispenser with the housing, wherein a belt is mounted about the pulley of the drive mechanism, auxiliary pulley, and weed trimmer pulley for rotating the weed trimmer pulley only when the belt is taut;

wherein the housing of the weed trimmer assembly extends downwardly past a lower edge of the flexible line dispenser, thereby covering a rear of the flexible line dispenser; and a weed trimmer actuation assembly including an actuation pulley mounted on the mower portion of the lawn mower and adapted to be rotated about a fourth axis residing within a designated plane which is fixed with respect to the mower portion of the lawn mower, a lever mounted on the handle of the lawn mower, and a cable connected between the lever and the actuation pulley for making the belt taut in an S-shaped configuration only when biased in an actuated orientation.

* * * * *